(12) United States Patent
Fang et al.

(10) Patent No.: US 8,157,557 B2
(45) Date of Patent: Apr. 17, 2012

(54) ROTARY DIE HEAD OF FILM BLOWING MACHINE FOR STARCH BIODEGRADABLE MATERIAL

(76) Inventors: Yong Fang, Wuhan (CN); Ping Wu, Wuhan (CN)

( * ) Notice: Subject to any disclaimer, the term of this patent is extended or adjusted under 35 U.S.C. 154(b) by 3 days.

(21) Appl. No.: 12/849,829

(22) Filed: Aug. 4, 2010

(65) Prior Publication Data

US 2011/0081440 A1 Apr. 7, 2011

Related U.S. Application Data

(63) Continuation of application No. PCT/CN2009/072491, filed on Jun. 26, 2009.

(30) Foreign Application Priority Data

Jun. 27, 2008 (CN) .......................... 2008 1 0048202

(51) Int. Cl.
B29C 47/24 (2006.01)
(52) U.S. Cl. .............. 425/192 R; 425/378.1; 425/379.1; 425/381; 425/466; 425/467
(58) Field of Classification Search .............. 425/192 R, 425/378.1, 379.1, 381, 381.2, 461, 466, 467
See application file for complete search history.

(56) References Cited

U.S. PATENT DOCUMENTS

| 3,520,966 | A | * | 7/1970 | Soffiantini | 264/171.29 |
|---|---|---|---|---|---|
| 3,613,162 | A | * | 10/1971 | Talsma | 425/381 |
| 3,666,389 | A | * | 5/1972 | Nelson | 425/324.1 |
| 4,541,793 | A | * | 9/1985 | Lindqvist | 425/206 |
| 5,256,051 | A | * | 10/1993 | Langos et al. | 425/133.1 |
| 5,447,279 | A | * | 9/1995 | Janssen et al. | 242/358 |

* cited by examiner

*Primary Examiner* — Yogendra Gupta
*Assistant Examiner* — Joseph Leyson
(74) *Attorney, Agent, or Firm* — Matthias Scholl P.C.; Matthias Scholl

(57) ABSTRACT

A rotary die head for a film blowing machine for use with a starch-based biodegradable material including a core mould and an outer body. The core mould includes a spiral core mould sleeved on a center pivot and a rotary core mould fixed on the center pivot, jointed with each other. A motor drives the center pivot and the rotary core mould to rotate. The outer body includes an inner die casing sleeved on the spiral core mould, an outer die casing fit with the inner die casing, and a mouth die casing. The inner die casing, the mouth die casing, the spiral core mould, and the rotary core mould form a material flow and molding channel consisting of a herringbone feed-in slot, spiral conveying slots, an annular gap buffer zone, a tapering cone passage, an annular loosing cavity, and a final molding gap in turn from bottom to top.

12 Claims, 4 Drawing Sheets

ROTARY DIE HEAD OF FILM BLOWING MACHINE FOR STARCH BIODEGRADABLE MATERIAL

CROSS-REFERENCE TO RELATED APPLICATIONS

This application is a continuation of International Patent Application No. PCT/CN2009/072491 with an international filing date of Jun. 26, 2009, designating the United States, now pending, and further claims priority benefits to Chinese Patent Application No. 200810048202.8 filed Jun. 27, 2008. The contents of all of the aforementioned applications, including any intervening amendments thereto, are incorporated herein by reference.

BACKGROUND OF THE INVENTION

1. Field of the Invention

The invention relates to film blowing equipment, and more particularly to a rotary die head for a film blowing machine for use with starch-based biodegradable material.

2. Description of the Related Art

Conventional blowing film molding includes the steps as follows. Plastic material from a front end of a screw extruder is pressed into a die head so that fluid plastic material turns into a siphonula through the die head. The siphonula is puffed up uniformly and freely to a tubular film with a big diameter by the compressed air from the bottom of the die head. The tubular film is extended longitudinally and cools down when drawn upwards. After that, the tubular film is flattened by a herringbone plate and draught by a drawing roller, finally rolled up. As the blowing film technique is increasingly mature, various plastic films have been applied in many fields, such as industry, agriculture, daily life and so on. Plastic films are polymer material products. Although the plastic film products bring people great convenience in use, improve the efficiency, and decrease the intensity of labor, a large amount of scrap films come into white pollution hard to be degraded. How to properly handle with the scrap films has become a tough problem.

To solve the above-mentioned problem, the scientific researchers have been trying to substitute the chemical plastic with natural biodegradable materials having high starch content. Multiple starch films which can be partially or completely biodegraded have been developed. The biodegradable film with high starch content can be melted by the moisture in the surroundings quickly and broken down by the microorganism in the soil fast, even can be transformed into fertilizer, which can ease the pollution problem caused by wasted plastic films to a great extent. And it possesses broad market prospect when people more and more care about the environment today. However, inherent characteristics of the starch-based biodegradable materials bring a new problem that cannot be manufactured in batches.

There are reasons as follows. First, compared with common high density polyethylene and low density polyethylene, starch-based biodegradable material has high viscosity and its fluidity is poor, which not only easily causes a nonuniform mixing and plasticizing, but also increases the pressure in the die head dramatically so that the conventional die heads are hard to mould the starch-based biodegradable material exactly. Second, the starch-based biodegradable material has a big shear stress, and the frictional heating during mixing and plasticizing will increase greatly. Under the condition, the conventional die heads cannot control the processing temperature accurately. Third, the starch-based biodegradable material is sensitive to the processing temperature. Excessive self-heating produced in processing will burn the material and change its properties. Thus, the processing temperature of the materials should be controlled strictly, which cannot be achieved by conventional die heads.

By this token, the blowing film principle of the starch-based biodegradable material is essentially the same as that of common plastic, but prior die heads of the film blowing machines cannot solve the problems caused by the new material due to its high viscosity, poor fluidity and sensitivity to the processing temperature. If starch-based biodegradable films is produced with the prior blowing film product line, the output and the quality thereof will be low, which cannot meet the requirements for mass industrial production.

SUMMARY OF THE INVENTION

In view of the above-described problems, it is one objective of the invention to provide a rotary die head for a film blowing machine for use with starch-based biodegradable material that features producing high quality products and is suitable for mass industrial production.

To achieve the above objectives, in accordance with one embodiment of the invention, there is provided a rotary die head for a film blowing machine for use with starch-based biodegradable material comprising a core mould and an outer body, wherein the core mould and the outer body are disposed concentrically and together form a material annular gap flow channel;

the core mould comprises a spiral core mould sleeved on a center pivot via a supporting bearing and a rotary core mould fixed on a top end of the center pivot via a locknut, and an inner coniform surface of a top end of the spiral core mould is jointed and cooperates with an outer coniform surface of a bottom end of the rotary core mould;

the outer body comprises an inner die casing sleeved on the spiral core mould, an outer die casing in transition fit with the inner die casing, and a mouth die casing surrounding the rotary core mould; an upper end of the inner die casing is fixed with a lower end of the mouth die casing via a fixing element; an outer circulation cooling water channel is disposed between an outer wall of the inner die casing and an inner wall of the outer die casing;

inner walls of the inner die casing and the mouth die casing and outer walls of the spiral core mould and the rotary core mould form a material flow and molding channel which comprises in sequence from bottom to top a herringbone feed-in slot, a spiral conveying slot, an annular gap buffer zone, a tapering cone passage, an annular loosing cavity, and a final molding gap;

the core mould and the outer body are mounted on a die base fixed on a connection plate; a lower end of the center pivot passes the connection plate and connects with a big gear; a motor is disposed on the connection plate and an output end of the motor is connected with a small gear; the small gear and the big gear are engaged with each other so as to drive the center pivot and the rotary core mould disposed at the top end thereof to rotate around the spiral core mould.

In a class of this embodiment, the center pivot comprises a deep blind hole formed in an axis thereof, in which an internal circulation cooling pipe is provided and at an end of which a rotary joint cooperating with the internal circulation cooling pipe is disposed to effectively control the temperature of the core mould by water cooling.

In a class of this embodiment, the mouth die casing comprises a spiral circulation cooling water channel in the wall thereof, which works together with the outer circulation cooling water channel to enhance the temperature control effect of the outer body.

Advantages of the invention are summarized below:

First, the material flow and molding channel, comprising the herringbone feed-in slot, the spiral conveying slot, the annular gap buffer zone, the tapering cone passage, the annular loosing cavity, and the final molding gap, is integrated by a smooth and continuous connection. The six parts have both respective functions and cooperative functions. The herringbone feed-in slot distributes the materials efficiently and ensures the materials to be transported equably under a condition that the flow rate and the flow speed are ensured. The spiral conveying slot changes the internal stress of the materials, which not only makes the temperature of the materials uniform, but also further plasticize the materials in the course of flowing. The annular gap buffer zone releases the pressure in the plasticizing materials temporarily so that the materials achieve a free and uniform state. The tapering cone passage increases the flow speed of the materials and reestablishes the pressure in the materials. The annular loosing cavity releases the pressure in the plasticizing materials again to eliminate changes in the course of flowing to make the state to be further free and uniform. The final molding gap establishes a pressure for film blowing again. Through the process including release pressure twice and establish pressure twice, the material have a more uniform temperature, pressure, and flow speed, which creates good conditions for film blowing molding.

Second, the herringbone feed-in slot, the spiral conveying slot, the annular gap buffer zone, and the tapering cone passage of the material flow and molding channel are static, through which the materials are transported, mixed, and plasticized steadily. The annular loosing cavity and the final molding gap are rotary dynamically. The core mould rotates slowly with a speed of 2 rmp by the drive of the motor and the slowdown gearing. The materials in the annular loosing cavity and the final molding gap move axially and tangentially with the drive of the rotary core mould, which eliminates the nonuniformity caused by the high viscosity and poor fluidity of the starch-based biodegradable material and further eliminates the internal stress and the velocity deviation of the materials so that the materials are distributed much evenly, which lays a good foundation for film blowing.

Third, the outer circulation cooling water channel surrounds the material flow and molding channel, so the heat generated in the inner die casing and the outer die casing can be absorbed by adjusting the flowing speed and flowing rate of the cooling water so as to control the frictional heating of the materials generated in the course of mixing and plasticizing. The temperature in each channel can be adjusted expediently to a required range. The internal circulation cooling pipe in the blind hole in the center pivot cools the core mould from the inside of the material flow and molding channel and cooperates with the outer circulation cooling water channel to further improve the accuracy of the temperature control of the materials. The spiral circulation cooling water channel in the wall of the mouth die casing accurately controls the material temperature in the final molding gap and ensures that the materials are blown molding at a temperature matching the characteristics thereof and suitable for mass industrial production.

As described above, the rotary die head of the film blowing machine of the invention comprises a static and dynamic material flow and molding channel and specific inner and outer circulation water cooling systems, so that the mixing, pressure release, pressure increase, and temperature control of the materials matches the characteristics thereof, which effectively solved the problem caused by that the starch-based biodegradable materials have high viscosity, poor fluidity and is sensitive to processing temperature. The film blowing speed is fast, the product quality is steady, and the good product rate is high. The whole production process is controlled automatically or artificially and meets the requirements for mass industrial production. Moreover, the rotary die head for a film blowing machine of the present invention can be mounted on a conventional film blowing machine, so the starch-based biodegradable film can be produced without adjusting the prior product line a lot. The starch-based biodegradable films have a low cost and can replace the plastic films, thereby removing the white pollution and obtaining good economic and social benefits.

DETAILED DESCRIPTION OF THE EMBODIMENTS

For further illustrating the invention, experiments detailing a rotary die head for a film blowing machine are described below. It should be noted that the following examples are intended to describe and not to limit the invention.

Figure 1:
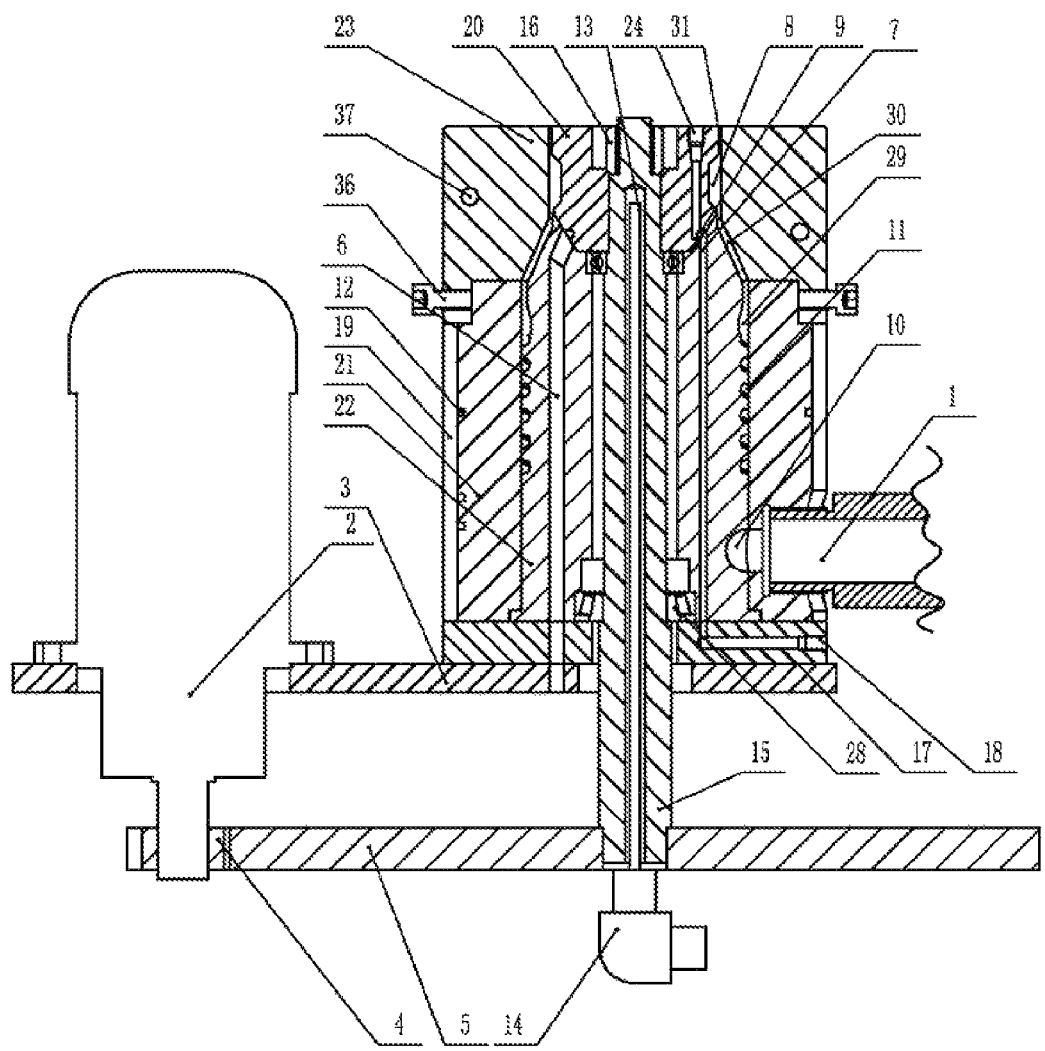
FIG. 1 is a sectional view of a rotary die head for a film blowing machine according to one embodiment of the invention.
Figure 2:
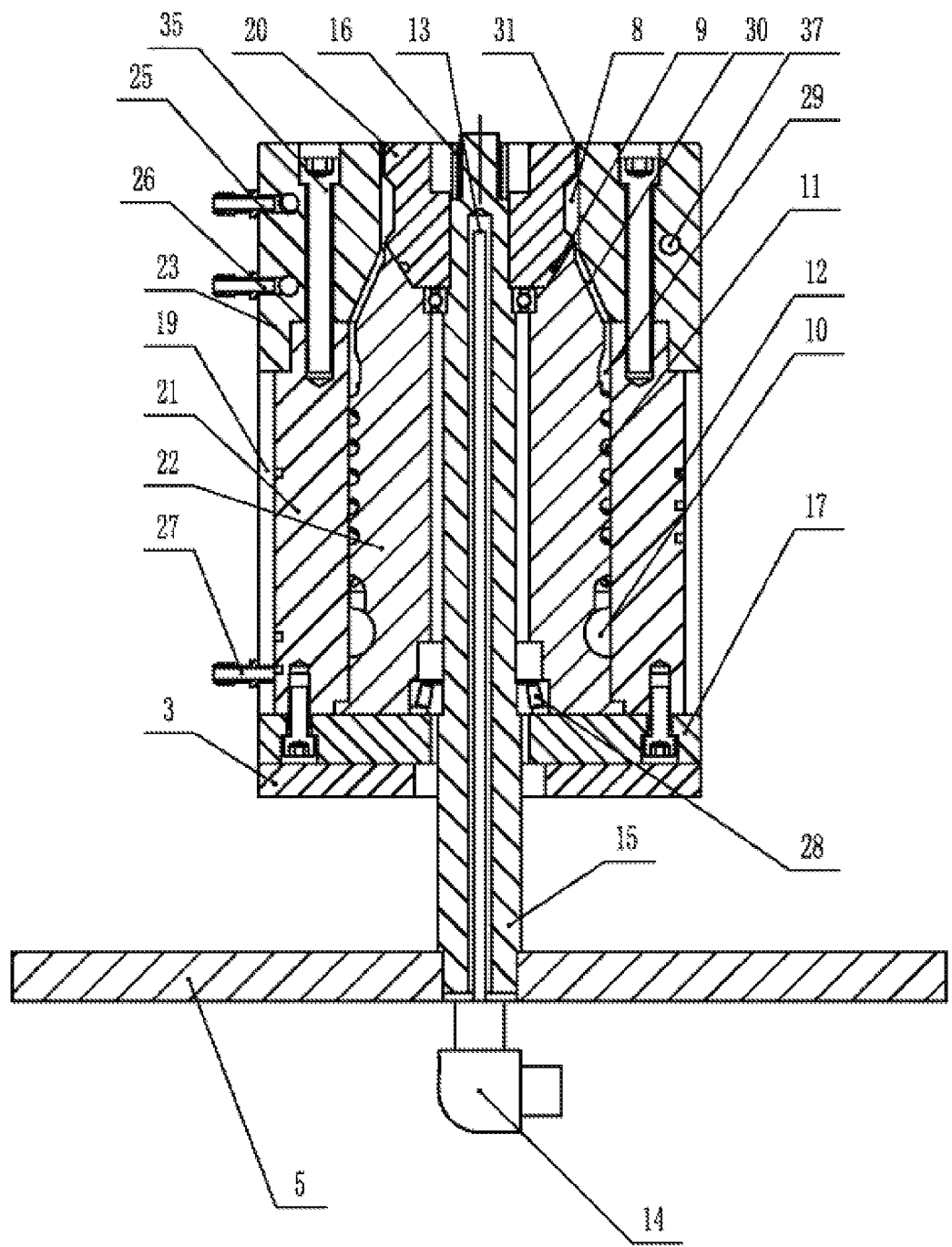
FIG. 2 is a left sectional view of the rotary die head of the film blowing machine as shown in FIG. 1 according to one embodiment of the invention.
Figure 3:
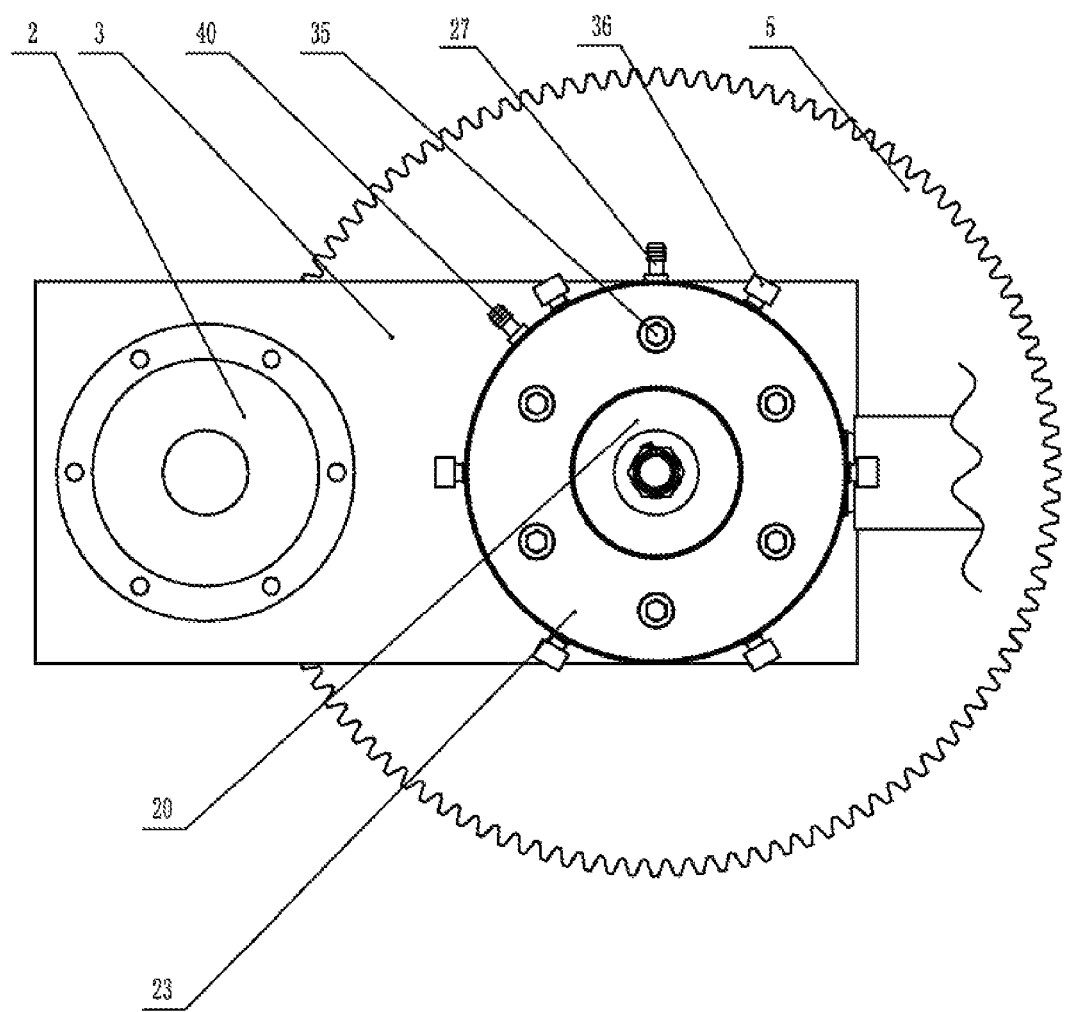
FIG. 3 is a top view of the rotary die head of the film blowing machine as shown in FIG. 1 according to one embodiment of the invention.
Figure 4:
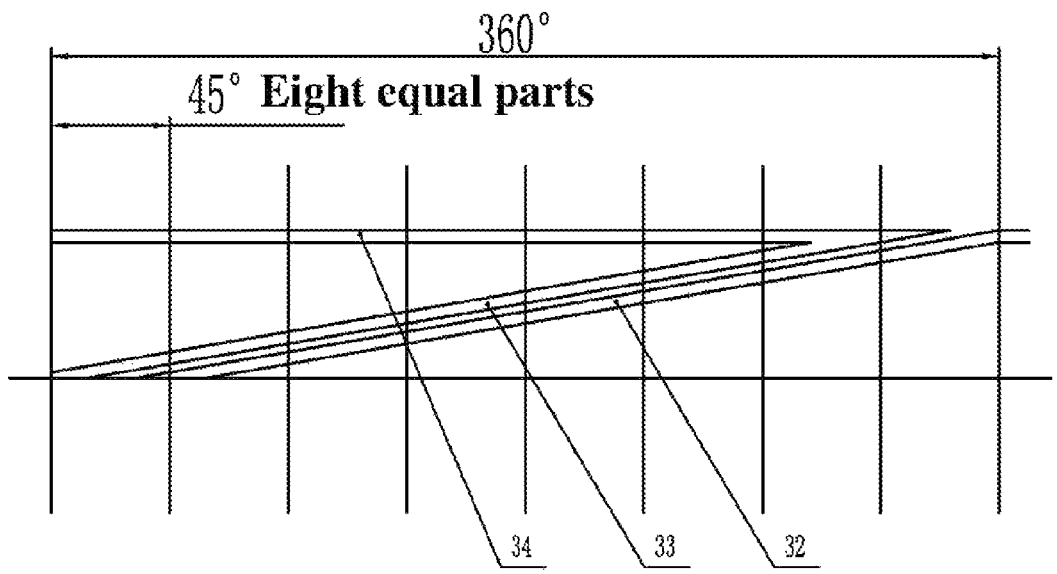
FIG. 4 is an unfolded view of an outer circulation cooling water channel as shown in FIG. 1 according to one embodiment of the invention.
Figure 5:
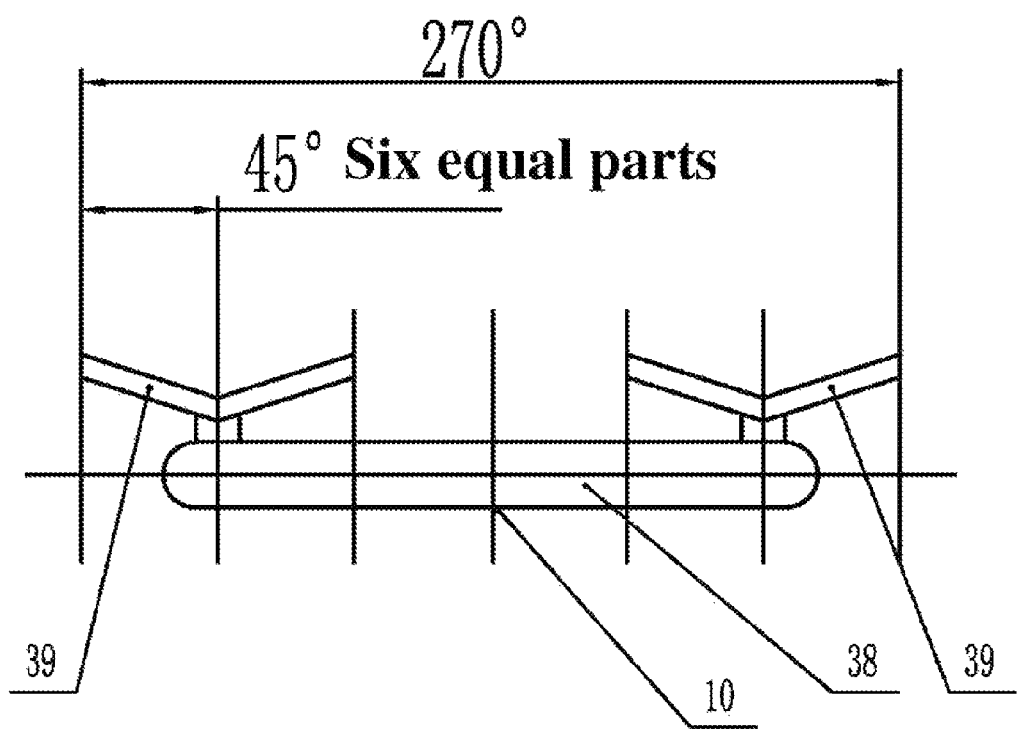
FIG. 5 is an unfolded view of a herringbone feed-in slot as shown in FIG. 1 according to one embodiment of the invention.

As shown in FIGS. 1-5, a rotary die head for a film blowing machine for use with starch-based biodegradable material comprises a core mould and an outer body. The core mould and the outer body are disposed concentrically and together form a material annular gap flow channel.

The core mould, a key part of the die head, comprises a spiral core mould 22 sleeved on a center pivot 15 via a supporting bearing 28 and a rotary core mould 20 fixed on a top end of the center pivot 15 via a locknut 16. A top end of the spiral core mould 22 is a concave inner coniform surface, and a bottom end of the rotary core mould 20 is a convex outer coniform surface, which are jointed and cooperate with each other. The locknut 16 on the center pivot 15 ensures the cooperation of the spiral core mould 22 and the rotary core mould 20. The rotary core mould 20 rotates along with the center pivot 15, while the spiral core mould 22 does not rotate.

The center pivot 15 comprises a deep blind hole formed in an axis thereof, in which an internal circulation cooling pipe 13 is provided and at an end of which a rotary joint 14 cooperating with the internal circulation cooling pipe 13 is disposed so as to constitute an inner internal circulation water-cooling system of the die head. Cooling water flows into the internal circulation cooling pipe 13 from the rotary joint 14 and flows out from a top end of the blind hole of the center pivot 15, and then flows downward along an inner wall of the blind hole of the center pivot 15, finally flows out from a water outlet of the rotary joint 14, which constitutes a complete water cooling circulation process.

The outer body comprises an inner die casing 21, an outer die casing 19, and a mouth die casing 23. The inner die casing 21 is sleeved closely on an outer wall of the spiral core mould 22, and they are in transition fit. The outer die casing 19 is sleeved closely on an outer wall of the inner die casing 21, and they are in transition fit. The mouth die casing 23 is disposed above the inner die casing 21 and the outer die casing 19 and surrounding the rotary core mould 20. An upper end of the inner die casing 21 is shaped as an annular platform, and a lower end of the mouth die casing 23 is shaped as a reversed annular platform, both of which are fastened with each other by a vertical bolt 35 and finely adjusted and located through a transverse bolt 36.

An outer circulation cooling water channel 12 is disposed between the outer wall of the inner die casing 21 and an inner wall of the outer die casing 19. The outer circulation cooling water channel 12 comprises two spiral water slots 32, 33 and a 315° annular water slot 34 disposed in the outer wall of the inner die casing 21. A lower end of the spiral water slot 32 is connected with a water inlet 27, and a lower end of the spiral water slot 33 is connected with a water outlet 40. Upper ends of the two spiral water slots 32, 33 are respectively connected with two ends of the 315° annular water slot 34. This constitutes an outer circulation water cooling system. The cooperation of the inner die casing 21 and the outer die casing 19 ensures the whole die casing is airproof.

A spiral circulation cooling water channel 37 is disposed in the wall of the mouth die casing 23. To make the spiral circulation cooling water channel 37 smooth and qualified, the mouth die casing 23 is divided into four blocks to process and then welded together. Two ends of the spiral circulation cooling water channel 37 are connected with exterior circulation cooling water source via a water inlet 25 of the mouth die casing and a water outlet 26 of the mouth die casing, respectively. The spiral circulation cooling water channel 37, as a supplement to the outer circulation cooling water channel 12, cools the die head and controls its temperature effectively.

Between the inner walls of the inner die casing 21 and the mouth die casing 23 and the outer walls of the spiral core mould 22 and the rotary core mould 20 formed is a material flow and molding channel comprising, in sequence from bottom to top, a herringbone feed-in slot 10, spiral conveying slots 11, an annular gap buffer zone 29, a tapering cone passage 30, an annular loosing cavity 8, and a final molding gap 31. The herringbone feed-in slot 10 comprises a semicircular slot 38 and two reversed herringbone sub-slots 39 disposed in the outer wall of the spiral core mould 22. Two ends of the semicircular slot 38 are respectively connected with two top ends of the two reversed herringbone sub-slots 39. There are four spiral conveying slots 11 whose lower ends are respectively connected with bottom ends of the two reversed herringbone sub-slots 39 and whose upper ends are connected with the annular gap buffer zone 29. The annular gap buffer zone 29, the tapering cone passage 30, the annular loosing cavity 8, and the final molding gap 31 cooperate to complete the following process comprising increasing pressure, decreasing pressure, extruding, and film blowing molding of the materials.

The core mould and the outer body are mounted on a die base 17. The inner die casing 21 is fixed to the die base 17 by a fixing bolt. The die base 17 is fixed on a connection plate 3 by another fixing bolt. A motor 2 is disposed on the connection plate 3. An output end of the motor 2 is connected with a small gear 4, a lower end of the center pivot 15 passes the connection plate 3 and connects with a big gear 5. The small gear 4 which works as an initiative gear and the big gear 5 which works as a passive gear are engaged with each other so as to drive the center pivot 15 and the rotary core mould 20 at the top end thereof to rotate around the spiral core mould 22.

The die base 17 comprises a horizontal air intake 18. The spiral core mould 22 comprises a vertical middle air passage 7. The rotary core mould 20 comprises a horizontal annular air passage 9 and a vertical air outtake 24. The air intake 18, the middle air passage 7, the annular air passage 9, and the air outtake 24 are connected in sequence to supply compressed air so as to complete the film blowing process.

The spiral core mould 22 comprises a sensor mounting hole 6 extending from the bottom up to the outer coniform surface of the lower end of the rotary core mould 20. The sensor mounting hole 6 is used for mounting a temperature sensor which monitors and feeds back the temperature of the die head so that the temperature sensor can work with the inner and outer water cooling systems and a heating system of the die head to maintain the processing temperature of the materials to a designed range.

The rotary die head of the film blowing machine of the invention is suspended from a screw extruder in use. A screw sleeve output end 1 of the screw extruder passes the outer die casing 19 and is connected to the inner die casing 21 with a threaded connection, and connected with the herringbone feed-in slot 10. The operating process is as below.

First, the starch-based biodegradable materials, which are pre-plasticized using a screw extruder, are extruded from the screw sleeve output end 1 into the herringbone feed-in slot 10. The materials first flow through the semicircular slot 38, and then flow into the top ends of the two reversed herringbone sub-slots 39 from two ends of the semicircular slot 38 and subsequently the bottom ends of the two reversed herringbone sub-slots 39 so that the materials are divided into two parts and then into quarters via two flow passages with different directions. The speed and pressure of the materials are changed because of the extruding force and speed, and the materials are equably transported to the spiral conveying slots 11 under a condition that the flow rate and the flow speed are ensured. A main function of the spiral conveying slot 11 is to change the internal stress of the materials, which not only makes the temperature of the materials uniform, but also further plasticizes the materials in the course of flowing for film blowing molding finally.

Second, the materials out of the spiral conveying slots 11 first flow into the annular gap buffer zone 29 to release the pressure so as to obtain a free and uniform state, and then flow into the tapering cone passage 30 and the annular loosing cavity 8 in sequence. At the same time, the motor 2 drives the center pivot 15 via the small gear 4 and the big gear 5, and therefore the rotary core mould 20 at the upper end of the center pivot 15 rotates. The rotary speed is about 2 rpm. Under the forces of the extruding pressure and the rotary core mould 20, the materials complete the process of pressure reestablishment and release. Thus, the materials possess a more uniform temperature, pressure, and flow speed, which is conducive to film blowing molding. Because the starch-based biodegradable materials have high viscosity and poor fluidity, resulting in nonuniformity, the rotary core mould 20 decreases and eliminates the nonuniformity. Thus, the materials form a good state in the course of film blowing, thereby improving the quality of the products and increasing the good product rate. When the materials are extruded via the final molding gap 31, they are distributed evenly because the rotation of the rotary core mould 20 effectively eliminates the internal stress and the velocity deviation of the materials, which lays a good foundation for film blowing.

Third, when the materials flows through the material flow and molding channel, the internal circulation cooling pipe 13 disposed in the blind hole of the center pivot 15, the outer circulation cooling water channel 12 disposed between the inner die casing 21 and the outer die casing 19, and the spiral circulation cooling water channel 37 disposed in the wall of the mouth die casing 23 are all initiated to control the temperature of the die head and the materials by water cooling. The reason for designing so many water cooling circulation systems is as below. Since the starch-based biodegradable materials have high viscosity and poor fluidity, after the materials are extruded into the die head from the screw extruder, the internal frictional and shear heating is big. The self-heating in the following molding process is too fast, and the materials are sensitive to the processing temperature, which easily changes of the materials' properties. Thus, the temperature is needed to be controlled in a reasonable range using a cooperative manner, such as monitoring and feeding back the temperature of the die head with a temperature sensor located in the sensor mounting hole 6 for providing bases for adjusting the flow speed and flow rate of the circulation cooling water.

Fourth, the materials out of the final molding gap 31 have a good processing state suitable for film blowing already. The newly-extruded film siphonula is very thick and has a high temperature, with the action of the compressed air puffed out from the air outtake 24, it is rapidly puffed up to form a film sleeve with a required diameter. The film sleeve is cooled by an exterior air vane matching the rotary die head to yield a film product. Finally, the film product is cut, flattened, and rolled-up to yield a rolled film goods.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A rotary die head for a film blowing machine for use with starch-based biodegradable material, comprising a core mould and an outer body, wherein
   the core mould and the outer body are disposed concentrically and together form a material annular gap flow channel;
   the core mould comprises a spiral core mould (22) sleeved on a center pivot (15) via a supporting bearing (28) and a rotary core mould (20) fixed on a top end of the center pivot (15) via a locknut (16), and an inner coniform surface of a top end of the spiral core mould (22) is jointed and cooperates with an outer coniform surface of a bottom end of the rotary core mould (20);
   the outer body comprises an inner die casing (21) sleeved on the spiral core mould (22), an outer die casing (19) in transition fit with the inner die casing (21), and a mouth die casing (23) surrounding the rotary core mould (20); an upper end of the inner die casing (21) is fixed with a lower end of the mouth die casing (23) via a fixing element; an outer circulation cooling water channel (12) is formed between an outer wall of the inner die casing (21) and an inner wall of the outer die casing (19);
   inner walls of the inner die casing (21) and the mouth die casing (23) and outer walls of the spiral core mould (22) and the rotary core mould (20) form a material flow and molding channel comprising in sequence from bottom to top a herringbone feed-in slot (10), a spiral conveying slot (11), an annular gap buffer zone (29), a tapering cone passage (30), an annular loosing cavity (8), and a final molding gap (31); and
   the core mould and the outer body are mounted on a die base (17) fixed on a connection plate (3); a lower end of the center pivot (15) passes the connection plate (3) and connects with a big gear (5); a motor (2) is disposed on the connection plate (3) and an output end of the motor (2) is connected with a small gear (4); the small gear (4) and the big gear (5) are engaged with each other so as to drive the center pivot (15) and the rotary core mould (20) at the top end thereof to rotate around the spiral core mould (22).

2. The rotary die head of claim 1, wherein the center pivot (15) comprises a deep blind hole formed in an axis thereof, in which an internal circulation cooling pipe (13) is provided and at an end of which a rotary joint (14) cooperating with the internal circulation cooling pipe (13) is disposed.

3. The rotary die head of claim 1, wherein
   an outer circulation cooling water channel (12) comprises two spiral water slots (32, 33) and a 315° annular water slot (34) formed in the outer wall of the inner die casing (21);
   a lower end of the spiral water slot (32) is connected with a water inlet (27); a lower end of the spiral water slot (33) is connected with a water outlet (40); and
   upper ends of the two spiral water slots (32, 33) are respectively connected with two ends of the 315° annular water slot (34).

4. The rotary die head of claim 2, wherein
   an outer circulation cooling water channel (12) comprises two spiral water slots (32, 33) and a 315° annular water slot (34) formed in the outer wall of the inner die casing (21);
   a lower end of the spiral water slot (32) is connected with a water inlet (27); a lower end of the spiral water slot (33) is connected with a water outlet (40); and
   upper ends of the two spiral water slots (32, 33) are respectively connected with two ends of the 315° annular water slot (34).

5. The rotary die head of claim 1, wherein the mouth die casing (23) comprises a spiral circulation cooling water channel (37) in the wall thereof.

6. The rotary die head of claim 2, wherein the mouth die casing (23) comprises a spiral circulation cooling water channel (37) in the wall thereof.

7. The rotary die head of claim 3, wherein the mouth die casing (23) comprises a spiral circulation cooling water channel (37) in the wall thereof.

8. The rotary die head of claim 1, wherein
   the herringbone feed-in slot (10) comprises a semicircular slot (38) and two reversed herringbone sub-slots (39) formed in the outer wall of the spiral core mould (22);
   two ends of the semicircular slot (38) are respectively connected with two top ends of the two reversed herringbone sub-slots (39); and
   there are four spiral conveying slots (11) whose lower ends are respectively connected with bottom ends of the two reversed herringbone sub-slots (39).

9. The rotary die head of claim 2, wherein
   the herringbone feed-in slot (10) comprises a semicircular slot (38) and two reversed herringbone sub-slots (39) formed in the outer wall of the spiral core mould (22);
   two ends of the semicircular slot (38) are respectively connected with two top ends of the two reversed herringbone sub-slots (39); and there are four spiral conveying slots (11) whose lower ends are respectively connected with bottom ends of the two reversed herringbone sub-slots (39).

10. The rotary die head of claim 3, wherein
the herringbone feed-in slot (10) comprises a semicircular slot (38) and two reversed herringbone sub-slots (39) formed in the outer wall of the spiral core mould (22);
two ends of the semicircular slot (38) are respectively connected with two top ends of the two reversed herringbone sub-slots (39); and
there are four spiral conveying slots (11) whose lower ends are respectively connected with bottom ends of the two reversed herringbone sub-slots (39).

11. The rotary die head of claim 5, wherein
the herringbone feed-in slot (10) comprises a semicircular slot (38) and two reversed herringbone sub-slots (39) formed in the outer wall of the spiral core mould (22);
two ends of the semicircular slot (38) are respectively connected with two top ends of the two reversed herringbone sub-slots (39); and
there are four spiral conveying slots (11) whose lower ends are respectively connected with bottom ends of the two reversed herringbone sub-slots (39).

12. The rotary die head of claim 7, wherein
the herringbone feed-in slot (10) comprises a semicircular slot (38) and two reversed herringbone sub-slots (39) formed in the outer wall of the spiral core mould (22);
two ends of the semicircular slot (38) are respectively connected with two top ends of the two reversed herringbone sub-slots (39); and
there are four spiral conveying slots (11) whose lower ends are respectively connected with bottom ends of the two reversed herringbone sub-slots (39).

* * * * *